3,766,281
PROCESS FOR PREPARING BISORGANOALKALINE EARTH METAL COMPOUNDS FROM ORGANOTIN COMPOUNDS
Peter West, Wellesley, and Mary C. Woodville, Milton, Mass., assignors to The Dow Chemical Company, Midland, Mich.
No Drawing. Filed July 27, 1972, Ser. No. 275,465
Int. Cl. C07f 3/00, 3/04
U.S. Cl. 260—665 R  7 Claims

ABSTRACT OF THE DISCLOSURE

Compounds of the formula $(R)_2M$, wherein M is calcium, strontium or barium and R is vinyl, allyl, 2-methallyl, benzyl or alkyl-substituted benzyl are prepared in the novel process comprising contacting calcium, strontium or barium with a solution of $(R)_4Sn$ dissolved in an inert solvent. As an example, diallylstrontium was prepared by contacting a solution of tetraallyltin in tetrahydrofuran with metallic strontium at room temperature for 22 hours in the presence of a catalytic amount of mercuric bromide.

BACKGROUND OF THE INVENTION

Bisorganoalkaline earth metal compounds and a method of preparing them from bisorganomercury reagents were described in our copending application Ser. No. 52,082, filed July 2, 1970 now Pat. No. 3,718,703. The bisorganoalkaline earth metal compounds are useful as polymerization initiators for vinyl monomers (e.g. styrene, acrylonitrile, etc.).

SUMMARY OF THE INVENTION

In our subsequent studies or bisorganoalkaline earth metal compounds, we have discovered a novel way of preparing compounds of the formula $(R)_2M$, where M is calcium, strontium or barium and R is vinyl, allyl, 2-methallyl, benzyl or alkyl-substituted benzyl. The novel process comprises reacting by contacting (a) calcium, strontium or barium with (b) a soltuion of $(R)_4Sn$ in an inert solvent. The compounds are useful as polymerization initiators for the polymerization of vinyl monomers.

The process proceeds in high conversion and excellent yields. The product is obtained as a solution or suspension in the reaction solvent medium and is easily separated from the metallic residue by simple conventional means.

The molar ratio of reactants is not critical but an excess of calcium, strontium or barium is preferable to insure substantially complete reaction and thus make efficient use of the more expensive organotin reactants.

The organotin reactants are represented by the formula $(R)_4Sn$, wherein R has the aforesaid meaning. Examples of suitable such compounds include those wherein R is vinyl, allyl, 2-methylallyl, benzyl, ar-methylbenzyl, ar-ethylbenzyl, ar-butylbenzyl, ar-t-amylbenzyl, ar-octylbenzyl, ar-dodecylbenzyl, ar-dimethylbenzyl, and the like. Preferred reactants are tetravinyl-, tetraallyl- and tetrabenzyltin.

The organotin reactants may be prepared by using the appropriate reactants in any of several known processes for preparing vinyl, allyl and benzyl derivatives of tin.

The organotin reactants are typically pre-dissolved in a suitable liquid electron donor-type solvent which is inert in the process. Illustrative of such solvents are cyclic aliphatic ethers (e.g. tetrahydrofuran, dioxane, etc.) and the like. Tetrahydrofuran is the preferred solvent.

The reaction temperature is typically selected in the range of from about 0° C. to about 40° C., based on the rate of reaction and stability of products. Temperatures in the range of from about 20° C. to about 30° C. are preferred. Temperatures outside of the 0°–40° range are operable but below about 0° C. the reaction rate is quite low, whereas above about 40° C. the product yield may be lowered by side reactions. Reaction times of from about 8 to about 36 hours are conventional in the above temperature ranges. The reaction times can be shortened in many instances by including a small but catalytic amount of mercuric bromide in the reaction mixture.

In view of the fact that organoalkaline earth metal products react with water and oxygen, the process is advantageously conducted under substantially anhydrous conditions and under an inert atmosphere (e.g. under a blanket of argon).

EXPERIMENTAL

The following examples further illustrate the invention.

Example 1.—Preparation of diallylcalcium

Tetraallyltin (0.5 ml.) dissolved in 5.5 ml. of dried distilled tetrahydrofuran (THF) was charged to a reaction vessel containing excess finely divided calcium under an argon blanket. Mercuric bromide (10.3 mg.) was added as a catalyst. The mixture was stirred in the dark at room temperature for 17.5 hours. The reaction mixture was centrifuged and the clear yellow supernatant solution containing the product was separated from residual metals. The NMR spectrum taken on the clear yellow supernatant indicated that very little by-product propylene was formed and a product yield of approximately 90% was obtained. There was very little, if any, unreacted tetraallyltin.

Example 2.—Preparation of diallylstrontium

In like manner, mercuric bromide (9.5 mg.) and tetraallyltin (0.5 ml.) in 5.5 ml. of dried distilled THF were charged to a reaction vessel containing excess finely divided strontium under a blanket of argon. The mixture was stirred for 22 hours at room temperature in the dark. The product was thus obtained as a grey-white solid suspended in a clear light-yellow supernatant. The producṫ was recovered by drawing off the suspension from the faster settling metallic residue, centrifuging the suspension and drawing off the supernatant liquid from the solid precipitate (the product). NMR analysis of the supernatant liquid and solid product before and after hydrolysis indicated that there was essentially no residual tetraallyltin in the liquid. The product yield and conversion were therefore essentially 100%.

Example 3.—Preparation of diallylbarium

Diallylbarium was produced in greater than 90% yield using essentially the same procedure detailed in Example 2 except that barium was used in place of strontium and the reaction time here used was 46.5 hours.

Divinylbarium was similarly prepared but the product was thermally unstable and/or reactive with THF and was not isolated.

The bisorganoalkaline earth metal compounds are known to be useful as polymerization initiators for vinyl polymerizaitons. One way in which they are typically used is as solutions or suspensions in THF. E.g. polystyrene is obtained by charging 0.2 millimole of dibenzylcalcium to a stirred mixture of 10 millimoles styrene in 10 ml. THF at 23° C. The reaction is exothermic and quite rapid. Polystyrene is obtained in essentially 100% yield. The resulting polystyrene can be molded into many useful articles.

We claim:
1. A process for preparing a compound of the formula $(R)_2M$, wherein M is calcium, strontium or barium and R is vinyl, allyl, 2-methyallyl, benzyl, or alkyl-substituted benzyl; said process comprising reacting by contacting (a) calcium, strontium or barium with (b) a solution of $(R)_4Sn$, wherein R has the aforesaid meaning, in an inert solvent.

2. The process defined by claim 1 wherein R is vinyl, allyl or benzyl.

3. The process defined by claim 1 wherein said process is conducted at a temperature of from about 0° to about 40° C.

4. The process defined by claim 1 wherein said temperature is from about 20° to about 30° C.

5. The process defined by claim 1 wherein said solvent is a cyclic aliphatic ether.

6. The process defined by claim 5 wherein said aliphatic ether is tetrahydrofuran.

7. The process defined by claim 4 wherein (b) is a solution of tetraallyltin in tetrahydrofuran.

References Cited
UNITED STATES PATENTS 3,277,182  10/1966  Pampus et al. ____ 260—665 R DANIEL E. WYMAN, Primary Examiner A. P. DEMERS, Assistant Examiner U.S. Cl. X.R.

260—93.5